United States Patent [19]
Sakakibara et al.

[11] Patent Number: 4,918,150
[45] Date of Patent: Apr. 17, 1990

[54] COMPOSITION COMPRISING VINYL ESTER, UNSATURATED URETHANE AND POLYBASIC ACID

[75] Inventors: Shigeru Sakakibara, Ichihara; Shunji Arimoto, Narashino, both of Japan

[73] Assignee: Dainippon Ink and Chemicals, Inc., Tokyo, Japan

[21] Appl. No.: 278,236

[22] Filed: Nov. 30, 1988

[30] Foreign Application Priority Data

Nov. 30, 1987 [JP] Japan .................................. 62-300038

[51] Int. Cl.$^4$ ........................ C08L 63/04; C08L 63/10
[52] U.S. Cl. .................................... 525/502; 525/528; 525/920; 522/92
[58] Field of Search ............... 525/502, 530, 531, 528; 522/92

[56] References Cited

U.S. PATENT DOCUMENTS

| | | | |
|---|---|---|---|
| 4,013,612 | 3/1977 | Tamura et al. | 525/502 |
| 4,404,075 | 9/1983 | Ikeda et al. | 525/531 |
| 4,690,987 | 9/1987 | Sakakibara et al. | 525/530 |
| 4,824,919 | 4/1989 | Baker et al. | 525/502 |

*Primary Examiner*—Lewis T. Jacobs
*Assistant Examiner*—Robert E. L. Sellers, II
*Attorney, Agent, or Firm*—Sherman and Shalloway

[57] ABSTRACT

An activation energy-curable resin composition comprising as an essential ingredient a resin obtained by reacting (a) a reaction product of a novolak-epoxy compound and an unsaturated monocarboxylic acid, (b) a reaction product of a diisocyanate and a poly(meth)acrylate having a hydroxyl group per moleucle and (c) at least one of an aromatic, aliphatic or alicyclic polybasic acid (or an anhydride thereof).

10 Claims, No Drawings

COMPOSITION COMPRISING VINYL ESTER, UNSATURATED URETHANE AND POLYBASIC ACID

The present invention relates to a novel and useful activation energy-curable resin composition. More particularly, it relates to a resin composition suitable for coating agents, printing inks, photoresists, adhesives, printing materials and curable with an activation energy radiation such as ultraviolet rays or electron rays, comprising as an essential ingredient a resin obtained by reacting three ingredients, namely a specified epoxy vinyl ester resin, a reaction product obtained by the reaction of a specific unsaturated urethane compound and a compound selected from at least one of an aromatic, aliphatic or alicyclic polybasic acid or an anhydride thereof.

It has hitherto been well-known that cured coated films are formed by irradiating a certain resin composition with an activation energy radiation such as electron rays or the like. Extensive researches have been made from the standpoint of eliminating the problems of environmental pollution, especially atmospheric pollution by solvents in coating compositions such as a paint or a printing ink which contain no solvent or have only a little content of a solvent and can be cured rapidly at room temperature or activation energy-curable materials such as a PS (presensitized) plate or the like instead of heat curing wherein polymerization is performed by heating.

For example, Japanese Patent Publication No. 4646/1982 discloses a photocurable resin composition which is obtained by the reaction of (A) an ether compound of an epoxy resin obtained by reacting an epoxy resin and an unsaturated hydroxy compound and (B) an unsaturated bond containing isocyanate prepolymer obtained by reacting an isocyanate and an unsaturated hydroxy compound or a higher unsaturated fatty acid substituted trihydric alcohol.

Japanese Patent Publication No. 40,329/1981 also discloses a reaction product of a bisphenol type epoxy resin, a photopolymerizable unsaturated carboxylic acid addition product and a dibasic carboxylic acid anhyride.

Conventional activation energy-curable resin compositions, however, have the defects of having a relatively low proportion of ethylenic unsaturated bonds, that is, a low functionality, thus having poor curability, heat resistance or solvent resistance.

The present inventors have now found that when (a) a specific epoxy vinyl ester obtained from a novolak-epoxy compound which may also be referred to as an unsaturated vinyl ester prepolymer and an unsaturated monocarboxylic acid is reacted with (b) an unsaturated urethane compound obtained by reacting a diisocyanate which may be referred to as an unsaturated urethane prepolymer, a hydroxyl-containing poly(meth)acrylate which contains both a hydroxyl group and 2 or more (meth)acryloyloxy groups such as trimethylolpropane diacrylate and, if necessary, a monofunctional hydroxyl-containing mono(meth)acrylate such as β-hydroxyethyl acrylate, and (c) at least one of aromatic, aliphatic or alicyclic polybasic acid (or an anhydride thereof) such as phthalic acid (or anhydride), trimellitic acid (or anhydride), maleic acid (or anhydride), succinic acid (or anhydride), itaconic acid (or anhydride), tetrahydrophthalic acid (or anhydride), hexahydrophthalic acid (or anhydride) or the like are reacted and a thus resulting specific activation energy-curable resin is used as an essential film forming ingredient to which a photopolymerizable monomer, a photopolymerization initiator, a solvent and the like are added to give a curable resin composition, a cured coated film having properties such as curability, heat resistance, solvent resistance, alkali developability which are exceptionally superior to those of conventional films can be obtained. Thus, the present inventors have reached the present invention.

Generally speaking, the present invention relates to an activation energy-curable resin composition comprising as an essential ingredient a resin obtained by reacting (a) a reaction product of a novolak-epoxy compound and an unsaturated monocarboxylic acid, (b) a reaction product of a diisocyanate and a poly(meth)acrylate having a hydroxyl group per molecule and (c) at least one of an aromatic, aliphatic or alicyclic polybasic acid or an anhydride thereof.

The constitution of the present invention will be explained in detail below.

(1) First of all, explanation will be made with reference to a reaction product (a) of the novolak-epoxy compound and the unsaturated monocarboxylic acid as a constituent of the activation energy-curable resin of the present invention.

Typical examples of the novolak-epoxy compound include phenol-novolak type epoxy resins or cresol-novolak type epoxy resins such as obtained by the addition reaction of a phenol/formaldehyde polycondensate or a polycondensation product of a $C_1$–$C_9$ alkyl group containing alkylphenol and a formaldehyde with epichlorohydrin or β-methylepichlorohydrin. The novolak-epoxy compounds particularly suitable for use in the present invention are those having 3 to 8 phenol nucleus residues, that is to say, trinuclear to octanuclear novolak-epoxy compounds.

When a novolak-epoxy compound having less than 3 phenol nucleus residues is used, along time is required for curing the surface of a coated film. On the other hand, when a novolak-epoxy compound having more than eight phenol nucleus, residues is used, it is liable to gel during urethanization, and even if the reaction product (a) is synthesized successfully, a large amount of a reactive diluent is required for retaining its coatability of a paint which will be made from the resulting resin composition. As a result, the curability, heat resistance or other properties of the resin are lowered, and thus, the object of the present invention by using the novolak-epoxy compound cannot be achieved.

When a polyfunctional bisphenol-type epoxy resin having a pendant hydroxyl group is solely used, the curability or heat resistance of the resulting resin composition is inferior to that obtained by using a variety of the novolak-epoxy compounds described above. This, however, does not preclude the use of a small amount of the polyfunctional bisphenol-type epoxy resin having a pendant hydroxyl group in combination with the novolak epoxy resin.

Typical examples of the unsaturated monocarboxylic acids include acrylic acid, methacrylic acid, crotonic acid, cinnamic acid or the like. These carboxylic acids may be used as a mixture of the two or more. The use of acrylic acid is especially suitable.

When the aforementioned reaction product (a) is prepared by reacting the novolak-epoxy compound and the unsaturated monocarboxylic acid, it is suitable to perform the reaction within the range of the equivalent ratio of the epoxy group

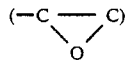

of the former epoxy compound to the carboxyl group (—COOH) of the latter carboxylic acid of 1.0 -1.7:1.0. If the equivalent ratio is less than 1.0:1.0, that is to say, the amount of the carboxylic group is larger, the unreacted unsaturated monocarboxylic acid adversely remains in the reaction product (a). If the equivalent ratio exceeds 1.7:1.0, or in other words, the amount of the epoxy group is excessively large as compared with that of the carboxylic group, the reaction product becomes unstable and thus undergoes gelling during the reaction.

(2) Next, explanation will be made with reference to the reaction product (b) of the poly(meth)acrylate containing a hydroxyl group per molecule (referred to hereinafter as polyfunctional hydroxyl group containing poly(meth)acrylate) and the diisocyanate.

Typical examples of the aforementioned polyfunctional hydroxyl group containing poly(meth)acrylate include pentaerythritol triacrylate, dipentaerythritol pentaacrylate, trimethylolpropane diacrylate, glycerol diacrylate or tris(hydroxyethyl)isocyanurate diacrylate or polymethacrylates corresponding to the aforementioned polyacrylates. These compounds may be used singly or as a mixture.

When it is not impossible to obtain the polyfunctional hydroxyl-containing poly(meth)acrylate in pure form, there may also be used a multi-component mixture in the form containing pentaerythritol tri(meth)acrylate as a main component and pentaerythritol di(meth)acrylate or pentaerythritol mono(meth)acrylate as an additional component instead of pure pentaerythritol tri(meth)acrylate. In the preparation of the reaction product (b), a monofunctional hydroxyl group-containing mono(meth)acrylate such as β-hydroxyethyl acrylate may be used according to the necessity.

On the other hand, typical examples of the diisocyanates include diisocyanate monomers such as 2,4- or 2,6-tolyene diisocyanate, xylylene- 1,4-diisocyanate, hydrogenated xylylene- 1,4-diisocyanate, hexamethylene diisocyanate, isophorone diisocyanate, diphenylmethane diisocyanate, toluidine diisocyanate or lysine diisocyanate; and isocyanate-terminated reaction products (urethane prepolymers) of these diisocyanate monomers and conventional known diols.

Polyisocyanates having three or more isocyanate groups such as "Desmodur L-75" (a trademark for a triol-diisocyanate adduct manufactured by Bayer AG, West Germany) are liable to induce gellation in the reaction with the reaction product (a). But the polyisocyanates having three or more isocyanate groups may be used in a small amount in combination with the diisocyanate described above. Thus, the aforementioned disadvantage will never preclude the use of the polyisocyanate in combination with the diisocyanate.

When the aforementioned reaction product (b) is prepared by reacting the polyfunctional hydroxyl group-containing poly(meth)acrylate and the diisocyanate, it is suitable to perform the reaction within the equivalent ratio of the hydroxyl group (—OH) of the former poly(meth) acrylate to the isocyanate group (—NCO) of the latter diisocyanate of 1.0:2.0 to 1.3:2.0.

If the equivalent ratio is less than 1.0:2.0, or in other words, the amount of isocyanate group is too large, the excessive amount of the diisocyanate remains in the aimed resin composition, and at the same time the reaction product (b) is undesirably liable to gel during the urethanization reaction process with the aforementioned reaction product (a). On the other hand, when the equivalent ratio exceeds 1.3:2.0, or in other words, the amount of the hydroxyl group is too large, the ratio of the product obtained by the reaction of one diisocyanate with two polyfunctional hydroxyl group-containing poly(meth)acrylate increases. Consequently, the crosslinking sites of the aimed resin composition adversely decrease to affect deleteriously on the properties of the composition such as solvent resistance or the like.

The equivalent ratio of —OH/—NCO is particularly preferably in the range of 1.0:2.0 to 1.2:2.0.

In this manner, the reaction product (b), i.e. the compound having one isocyanate group and two or more (meth)acryloyloxy groups per molecule (unsaturated urethane compound) is obtained.

(3) Next, explanation will be made with reference to the component (c) as a constituent of an activation energy-curable resin composition of the present invention which is selected from one or more of aromatic, aliphatic or alicyclic polycarboxylic acids or anhydrides thereof.

The aforementioned component (c) includes phthalic acid (or anhydride), trimellitic acid (or anhydride), pyromellitc acid (or anhydride), Hettic acid ® (or anhydride), tetrachlorophthalic and (or anhydride), maleic acid (or anhydride), succinic acid (or anhydride), dodecynylsuccinic acid (or anhydride), citraconic acid (or anhydride), itaconic acid (or anhydride), tetrahydrophthalic acid (or anhydride), hexahydrophthalic acid (or anhydride), methyltetrahydrophthalic acid (or anhydride), methylhexahydrophthalic acid (or anhydride), 3,6-endomethylenetetrahydrophthalic acid (or anhydride), 3-methyltetrahydrophthalic acid (or anhydride), SMT-700(manufactured by NIPPON TERPENE KAGAKU Co.) or the like.

Explanation will be made with reference to the reaction of the reaction product (a), the reaction product (b) and the polycarboxylic acid (or anhydride) component (c).

The reaction is preferably conducted by using the reactants so that the equivalent ratios of the isocyanate group (—NCO) of the reaction product (b), the group

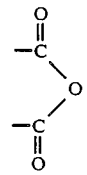

of the polycarboxylic acid (or anhydride) (c) and the hydroxyl group of the reaction product (a) are in the following ranges:

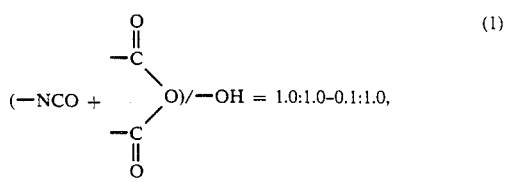

$$-NCO/-OH = 0.3:1.0 - 0.02:1.0 \quad (2)$$

and

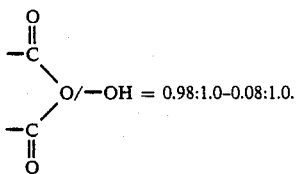
$$\diagdown O/-OH = 0.98:1.0 - 0.08:1.0.$$

When the equivalent ratio (1) exceeds 1.0:1.0, the isocyanate group is present in an excessive amount thus lowering the storage stability of the activation energy-curable resin composition of the present invention, or the polycarboxylic acid (or anhydride) is present in an excessive amount thus undesirably affording unreacted polycarboxylic acid (or anhydride). On the other hand, if the equivalent ratio (1) is less than 0.1:1.0, the curability of the activation energy-curable resin composition of the present invention decreases undesirably. Amongst these equivalent ratios, the particularly desirable ranges are as follows:

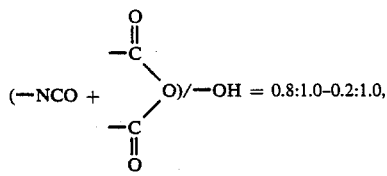
$$(-NCO + \diagdown O)/-OH = 0.8:1.0 - 0.2:1.0,$$

$$-NCO/-OH = 0.2:1.0 - 0.05:1.0 \text{ and}$$

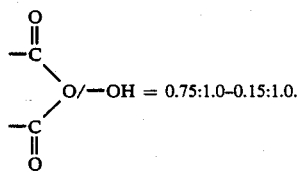
$$\diagdown O/-OH = 0.75:1.0 - 0.15:1.0.$$

Also, the number (content) of the ethylenic unsaturated bond contained in the activation energy-curable resin composition of the present invention is desirably on an average 5 or more per molecule of the resulting resin.

Although either the reaction product (b) or the polycarboxylic acid (c) may be first reacted with the reaction product (a), it is not preferable to react simultaneously both components (b) and (c) with the component (a).

In other words, when the essential resin component (film forming component) in the activation energy-curable resin composition of the present invention is prepared, the gellation during the reaction can be avoided by stepwise conducting the urethanization reaction. However, in such cases as reacting simultaneously the reaction product (a), the diisocyanate and the polyfunctional hydroxyl group-containing poly(meth)acrylate, reacting the mixture of the reaction product (a) and the polyfunctional hydroxyl group-containing poly(meth)acrylate with the diisocyanate or simultaneously reacting the component (a) with the components (b) and (c), gellation tends to occur during the reaction.

In the reaction, there may be used a solvent usually employed in ordinary urethanization reactions such as ethyl acetate, methyl ethyl ketone, toluene, methyl Cellosolve acetate, ethyl Cellosolve acetate, butyl Cellosolve acetate, ethyl carbitol acetate or butyl carbitol acetate. There may be also used among reactive diluents which are customarily employed in ordinary activation energy-curable resin the one having no active hydrogen reactive with this isocyanate such as ethylene glycol di(meth)acrylate, 1,6-hexanediol di(meth)acrylate or trimethylolpropane tri(meth)acrylate.

The activation energy-curable resin of the present invention prepared in the manner described above, that is, the resin obtained by reacting the reaction product (a) having a number of ethylenic double bonds and hydroxyl groups in its molecule which is obtained by reacting the novolak-epoxy compound and the unsaturated monocarboxylic acid, the reaction product (b) having ethylenic unsaturated bonds and isocyanate groups which is obtained by reacting the polyfunctional hydroxyl group-containing poly(meth)acrylate and the diisocyanate, and the polycarboxylic acid (or anhydride) component (c) has a property that curing will occur very rapidly by the crosslinking between molecules on irradiation with an activation energy such as ultraviolet rays or electron beams.

The activation energy-curable resin composition of the present invention comprises the thus resulting resin as an essential component. If necessary, it may further include a (meth)acrylate type reactive diluent such as trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, pentaerythritol penta(meth)acrylate, dipentaerythritol tetra(meth)acrylate, dipentaerythritol penta(meth)acrylate, dipentaerythritol hexa(meth)acrylate, 1,6-hexanediol di(meth)acrylate, polyethylene glycol di(meth)acrylate, β-hydroxyethyl (meth)acrylate, β-hydroxypropyl (meth)acrylate, N-vinylpyrrolidone, 2-hydroxyethyl (meth)acryloyl phosphate, diethylaminoethyl (meth)acrylate, bis[(meth)acryloyloxyethoxy]bisphenol A or the like; a solvent such as toluene, methyl ethyl ketone, ethyl acetate, butyl iso-propanol, ethyl Cellosolve, ethyl Cellosolve acetate, butyl Cellosolve acetate, ethyl carbitol acetate or the like; a stabilizer (polymerization inhibitor) such as hydroquinone, hydroquinone monomethyl ether, 2,6-di-tert-butylhydroquinone, 2,6-di-tert-butyl-4ethylphenol, tert-butylcatecol or phenothiazine; an inorganic filler such as calcium carbonate, talc, silica or the like; a coloring agent such as phthalocyanine blue, phthalocyanine green or the like; or other additives such as an antifoamer or a levelling agent.

When the composition of the present invention is used for curing with ultraviolet rays, it is necessary to add to the composition a so-called photopolymerization initiator in order to initiate the polymerization reaction of the aforementioned resin component (film forming component) by ultraviolet rays. Typical examples of such a photopolymerization initiator include benzoin, benzoin methyl ether, benzoin ethyl ether, benzoin formate, 1-hydroxy-1-benzoylcyclohexane, dibutoxyacetophenone, α-hydroxy-iso-butyrophenone, p-isopropyl-α-methoxy-iso-butyrophenone, benzyl diphenyl disulfide benzophenone, azobisisobutyro nitrile or the like.

The activation energy-curable resin composition of the present invention is applicable as an adhesive for transparent plastic films, a potting material for electrical appliance parts, or a binder for paints or inks (particularly paints or printing inks for metals, paper, woods or plastics), resist inks for printed wirings, photoresists for the preparation of IC's, printing materials or the like.

As the irradiation (light) sources for curing the activation energy-curable resin composition of the present invention, there are used solar light, a low-pressure mercury lamp, a medium pressure mercury lamp, a high pressure mercury lamp, a superhigh pressure mercury lamp, a xenon lamp, a halide lamp, or an electron beam irradiating device.

In this case, a heating means other than the aforementioned means may be used in combination therewith in aid of curing.

Next, the present invention will be explained more specifically with reference to referential examples, a comparative referential example, examples and comparative examples, but it should not be construed to be limited to these examples. All parts and percentages are by weight unless otherwise specified.

REFERENTIAL EXAMPLE 1

To Cellosolve acetate was dissolved 1.05 equivalent amounts of a cresol-novolak-epoxy compound having an epoxy equivalent of 213 and containing on an average 4.5 phenol nucleus residues per molecule and epoxy groups. To the solution were added 1 equivalent amount of acrylic acid, 0.15 g of hydroquinone and 1.5 g of N,N-dimethylbenzylamine, and the mixture was reacted at ca. 90° C. until the acid value of the reaction mixture reached 5 or less. Thus, a reaction product (a) was obtained.

Next, a reaction product (b) was obtained by preliminarily reacting 0.44 equivalent amount of isophorone diisocyanate and 0.24 equivalent amount of pentaerythritol triacrylate in a solvent of Cellosolve acetate in the presence of 0.08 g of hydroquinone and 0.02 g of dibutyltin dilaurate at a temperature of 60° C. for about 3 hours. It was added to the reaction product (a) obtained above, and the reaction was conducted at 60° C. for 10 hours.

After the reaction was completed, 0.4 mole of maleic anhydride was added to the mixture, and the reaction was further conducted at 90° C. for 5 hours. In this manner, the aimed resin having on an average 7.2 acryloyloxy groups and 1.8 carboxyl groups per molecule was obtained.

REFERENTIAL EXAMPLE 2

To Cellosolve acetate was dissolved 1.02 equivalent amounts of a cresol-novolak-epoxy compound having an epoxy equivalent of 227 and containing on an average 6 phenol nucleus residues per molecule and epoxy groups. To the solution were added 1 equivalent amount of acrylic acid, 0.15 g of hydroquinone and 1.5 g of N,N-dimethylbenzylamine, and the mixture was reacted at ca. 90° C. until the acid value of the reaction mixture reached 5 or less. Thus, a reaction product (a) was obtained.

Next, a reaction product (b) was obtained by preliminarily reacting 0.50 equivalent amount of toluene diisocyanate and 0.30 equivalent amount of pentaerythritol triacrylate in a solvent of Cellosolve acetate in the presence of 0.01 g of hydroquinone and 0.017 g of dibutyltin dilaurate at a temperature of 60° C. for about 3 hours. It was added to the reaction product (a) obtained above, and the reaction was conducted at 60° C. for 11 hours.

After the reaction had been finished, 0.6 mole of maleic anhydride was added to the mixture, and the reaction was further conducted at 100° C. for 5 hours. In this manner, the aimed resin having on an average 9.6 acryloyloxy groups and 3.6 carboxyl groups per molecule was obtained.

REFERENTIAL EXAMPLE 3

To Cellosolve acetate was dissolved 1.05 equivalent amounts of a cresol-novolak-epoxy compound having an epoxy equivalent of 186 and containing on an average 4.5 phenol nucleus residues per molecule and epoxy groups. To the solution were added 1 equivalent amount of acrylic acid, 0.15 g of hydroquinone and 1.5 g of N,N-dimethylbenzylamine, and the mixture was reacted at ca. 90° C. until the acid value of the reaction mixture reached 5 or less. Thus, a reaction product (a) was obtained.

Next, a reaction product (b) was obtained by preliminarily reacting 0.22 equivalent amount of isophorone diisocyanate and 0.12 equivalent amount of pentaerythritol triacrylate in a solvent of Cellosolve acetate in the presence of 0.0375 g of hydroquinone and 0.0075 g of dibutyltin dilaurate at a temperature of 60° C. for about 3 hours. It was added to the reaction product (a) obtained above, and the reaction was conducted at 60° C. for 10 hours.

After the reaction had been finished, 0.5 mole of hexahydrophthalic anhydride was added to the mixture, and the reaction was further conducted at 100° C. for 5 hours. In this manner, the aimed resin having on an average 5.9 acryloyloxy groups and 2.25 carboxyl groups per molecule was obtained.

REFERENTIAL EXAMPLE 4

To Cellosolve acetate was dissolved 1.02 equivalent amounts of a cresol-novolak-epoxy compound having an epoxy equivalent of 227 and containing on an average 6 phenol nucleus residues per molecule and epoxy groups. To the solution were added 1 equivalent amount of methacrylic acid, 0.15 g of hydroquinone and 1.5 g of N,N-dimethylbenzylamine, and the mixture was reacted at ca. 90° C. until the acid value of the reaction mixture reached 5 or less. Thus, a reaction product (a) was obtained.

Next, a reaction product (b) was obtained by preliminarily reacting 1.25 equivalent amounts of toluene diisocyanate and 0.75 equivalent amount of pentaerythritol triacrylate in a solvent of Cellosolve acetate in the presence of 0.22 g of hydroquinone and 0.043 g of dibutyltin dilaurate at a temperature of 60° C. for about 3 hours. It was added to the reaction product (a) obtained above, and the reaction was conducted at 60° C. for 10 hours.

After the reaction had been finished, 0.1 mole of pyromellitic anhydride was added to the mixture, and the reaction was further conducted at 90° C. for 5 hours. In this manner, the aimed resin having on an average 15 acryloyloxy groups and 1.2 carboxyl groups per molecule was obtained.

REFERENTIAL EXAMPLE 5

To Cellosolve acetate was dissolved 1.02 equivalent amounts of a cresol-novolak-epoxy compound having an epoxy equivalent of 213 and containing on an average 4.5 phenol nucleus residues per molecule and epoxy groups. To the solution were added 1 equivalent amount of acrylic acid, 0.15 g of hydroquinone and 1.5 g of N,N-dimethylbenzyamine, and the mixture was reacted at ca. 90° C. until the acid value of the reaction mixture reached 5 or less. Thus, a reaction product (a) was obtained.

To the reaction product (a) was added 0.45 mole of succinic anhydride, and the mixture was reacted at 90° C. for 5 hours.

Next, a reaction product (b) was obtained by preliminarily reacting 0.37 equivalent amount of dipentaerythritol pentaacrylate and 0.67 equivalent amount of tolylene diisocyanate in a solvent of Cellosolve acetate in the presence of 0.21 g of hydroquinone and 0.04 g of dibutyltin dilaurate at a temperature of 60° C. for about 3 hours. It was added to the reaction product obtained above, and the reaction was conducted at 60° C. for 10 hours.

In this manner, the aimed resin having on an average 11.3 acryloyloxy groups and 9 carboxyl groups per molecule was obtained.

COMPARATIVE REFERENTIAL EXAMPLE 1

To Cellosolve acetate was dissolved 1.02 equivalent amount of an epoxy resin as the reaction product of epichlorohydrin and bisphenol A having a molecular weight of 1,000 and containing on an average 2 epoxy groups and 2.2 hydroxyl groups per molecule. To the solution were added 1 equivalent amount of acrylic acid, 0.29 g of hydroquinone and 0.29 g of N,N-dimethylbenzylamine, and the reaction was conducted at a temperature of 90° C. until the acid value reached 5 or less. Next, the resulting mixture was further reacted with 0.5 mole of dodecynylsuccinic anhydride at 90° C. for 5 hours. Thus, a resin having on an average two acryloyloxy groups and one carboxyl group per molecule was obtained.

EXAMPLE 1-5 AND COMPARATIVE EXAMPLE 1

To 100 parts of each of the resin compositions obtained in Referential Examples 1-5 and Comparative Referential Example 1 was added 2.5 parts of benzoinisopropyl ether to prepare an ultraviolet rays-curable paint. Each paint was coated on a soft steel plate to a thickness of 50 μm and dried.

When the coated film after drying was wiped with a gauze impregnated with ethyl acetate, it was easily dissolved and thus it was confirmed that no curing occurred in all cases.

The coated film was cured by irradiating it with ultraviolet rays by passing it under a high pressure mercury lamp at the distance of 15 cm below the lamp at a speed of 20 m/min.

Then, the properties of the cured films were evaluated.

The results are summarized in Table 1.

The properties were evaluated as follows:

Curability . . . The coated film was wiped with a gauze impregnated with ethyl acetate, and the degree of dissolution of the coated film was visually evaluated.

⊚ . . . No change was observed.

○ . . . The surface changed slightly.

Δ . . . The coated film partly dissolved.

X . . . The coated film completely dissolved.

Heat softening resistance . . . The coated film was left to stand in a heating furnace at 280° C. for 20 seconds, and then a gauze was immediately press-bonded to the coated surface. After cooling, the gauze was peeled off, and the state of the coated film was visually evaluated.

⊚ . . . No change was observed.

○ . . . The trace of the gauze was left on the surface.

X . . . The coated film melted and was peeled off together with the gauze.

Heat decomposition initiation temperature . . . The temperature of initiating the thermal decomposition and the retention of a sample (initial sample: ca. 10 g) in the TG curve measured in air using a measuring instrument of TG/DTA 30 Type made by Seiko Instruments and Electronics Ltd., at a temperature programming rate of 10° C. /min were shown.

EXAMPLE 6

The resin composition obtained in Referential Example 4 was directly used as an electron rays-curable paint, coated on a soft steel plate to a thickness of 50 μ and dried.

As for the dried film, treatment was performed in the same manner as in Examples 1-3 and Comparative Example 1, and it was confirmed that no curing of the film occurred in this step.

Next, the coated film was irradiated with electron beams at a dose of 5 Mrads in an oxygen concentration of 3,000 ppm and at an acceleration voltage of 170 KV to give a cured film. The properties of the cured film thus obtained was evaluated, and the results are also summarized in Table 1.

COMPARATIVE EXAMPLE 2

To Cellosolve acetate was dissolved 1.05 equivalent amount of a cresol-novolak-epoxy compound having an epoxy equivalent of 213 and containing on an average 7.6 phenol nucleus residues per molecule and epoxy groups. To the solution were added 1 equivalent amount of acrylic acid, 0.15 g of hydroquinone and 1.5 g of N,N-dimethylbenzylamine, and the reaction was conducted at a temperature of ca. 90° C. until the acid value reached 5 or less. Thus, the reaction product (a) was obtained.

Next, 0.4 mole of maleic anhydride was added to the reaction product (a), and the mixture was reacted at 90° C. for 5 hours. In this manner, a control resin having on an average 7.2 acryloyloxy groups and 1.8 carboxyl groups per molecule was obtained.

An ultraviolet rays-curable paint was prepared in the same manner as in Examples 1-5 and Comparative Example 1. Then, the paint was coated, dried and irradiated with ultraviolet rays to obtain a control cured film.

The properties of the film thus obtained was evaluated as above, and the results are summarized in Table 1.

COMPARATIVE EXAMPLE 3

A control resin having on an average 7.2 acryloyloxy groups per molecule was obtained in the same manner as in Comparative Example 2 except that the reaction product (b) and maleic anhydride were not used.

An ultraviolet rays-curable paint was prepared in the same manner as in Examples 1-5 and Comparative Example 1. Then, the paint was coated, dried and irradiated with ultraviolet rays to obtain a control cured film.

The properties of the film thus obtained was evaluated as above, and the results are summarized in Table 1.

The term "developability" specified in the table means alkali developability, that is, the developability on the usual development with a weak alkaline aqueous solution of 1% aqueous sodium carbonate solution at a spray pressure of 2 Kg/cm² which was visually judged through a microscope.

TABLE 1

|  | Example 1 | Example 2 | Example 3 | Example 4 | Example 5 |
|---|---|---|---|---|---|
| Resin used | Referential Example 1 | Referential Example 2 | Referential Example 3 | Referential Example 4 | Referential Example 5 |
| Number of acryloyl groups per molecule | 7.2 | 9.6 | 5.9 | 15 | 11.3 |
| Number of carboxyl groups per molecule | 1.8 | 3.6 | 2.25 | 1.2 | 2 |
| Number of urethane bonds per molecule | 1.9 | 2.9 | 0.9 | 7.4 | 3.0 |
| Curability |  |  |  |  |  |
| 1 passing |  |  |  |  |  |
| 4 passings |  |  |  |  |  |
| 10 passings |  |  |  |  |  |
| Heat softening resistance |  |  |  |  |  |
| 10 passings |  |  |  |  |  |
| Thermal decomposition initiating temperature, 10 passings | 324 | 326 | 320 | 330 | 328 |
| Retention at 400° C. in the TC curve |  |  |  |  |  |
| 10 passings | 75.0 | 76.8 | 73.2 | 79.0 | 78.2 |
| Developability | Good | Good | Good | Good | Good |

|  | Example 6 | Comparative Example 1 | Comparative Example 2 | Comparative Example 3 | Remarks |
|---|---|---|---|---|---|
| Resin used | Referential Example 4 | Comparative Referential Example 1 | Comparative Example 2 | Comparative Example 3 |  |
| Number of acryloyl groups per molecule | 15 | 2 | 7.2 | 7.2 |  |
| Number of carboxyl groups per molecule | 1.2 | 1 | 1.8 | 0 |  |
| Number of urethane bonds per molecule | 7.4 | 0 | 0 | 0 |  |
| Curability |  |  |  |  |  |
| 1 passing |  | X | X | X | UV-curing |
| 4 passings |  | Δ |  |  | " |
| 10 passings |  |  |  |  | " |
|  |  |  |  |  | Electron rays-curing |
| Heat softening resistance |  |  |  |  |  |
| 10 passings |  | Δ |  |  | UV-curing |
|  |  |  |  |  | Electron rays-curing |
| Thermal decomposition initiating temperature, 10 passings | 323 | 300 | 325 | 327 | UV-curing Electron rays-curing |
| Retention at 400° C. in the TC curve |  |  |  |  |  |
| 10 passings |  | 40.5 | 74.1 | 75.2 | UV-curing |
|  | 75.3 |  |  |  | Electron rays-curing |
| Developability | Good | Good | Good | Poor |  |

The activation energy-curable resin of the present invention prepared by the reaction of (a) a reaction product of a novolak-epoxy compound and an unsaturated monocarboxylic acid, (b) a reaction product of a diisocyanate and a polyfunctional hydroxyl group-containing poly(meth)acrylate and (c) a polycarboxylic acid is excellent in curability (solvent resistance) and heat resistance as compared with conventional photocurable resins.

Accordingly, an activation energy-curable resin composition containing as an essential component the resin component of the present invention is very useful in extensive applications such as a coating agent, an ink photoresist or the like.

What is claimed is:

1. An activation energy-curable resin composition comprising as an essential ingredient a resin obtained by reacting (a) a reaction product of a novolak-epoxy compound and an unsaturated monocarboxylic acid, (b) a reaction product having one isocyanate group of a diisocyanate and a poly(meth)acrylate having a hydroxyl group per molecule and (c) at least one of an aromatic, aliphatic or alicyclic polybasic acid or an anhydride thereof.

2. An activation energy-curable resin composition according to claim 1, wherein said reaction product (a) of the novolak-epoxy compound and the unsaturated monocarboxylic acid is obtained by the addition reaction of a polycondensate of phenol and formaldehyde with epichlorohydrin or β-methylepichlorohydrin.

3. An activation energy-curable resin composition according to claim 1, wherein said reaction product (a) of the novolak-epoxy compound and the unsaturated monocarboxylic acid is obtained by the addition reaction of a polycondensate of an alkyl phenol having a $C_1$–$C_9$ alkyl group and formaldehyde with epichlorohydrin or β-methylepichlorohydrin.

4. An activation energy-curable resin composition according to any one of claims 1, 2 or 3 wherein said novolak-epoxy compound contains from 3 to 8 phenol nucleus residues.

5. An activation energy-curable resin composition according to claim 1 wherein the unsaturated monocarboxylic acid is acrylic acid, methacrylic acid, crotonic acid or cinnamic acid.

6. An activation energy-curable resin composition according to claim 1, wherein the reaction product (a), the novolak-epoxy compound and the unsaturated monocarboxylic acid are reacted at an equivalent ratio of the epoxy group of the novolak-epoxy compound to the carboxyl group of the monocarboxylic acid in the range of from 1.0–1.7:1.0.

7. An activation energy-curable resin composition according to claim 1 wherein the resin is obtained by reacting the reaction product (a), reaction product (b) and polybasic acid or anhydride (c) at equivalent ratios of the isocyanate group (—NCO) of the reaction product (b), the group

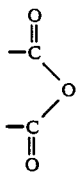

of the polycarboxylic acid or anhydride thereof (c) and the hydroxyl group (—OH) of the reaction product (a) in the following ranges

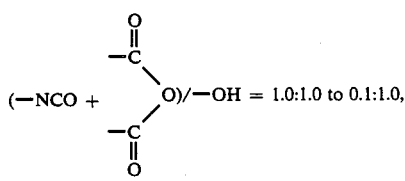
(—NCO + ...O)/—OH = 1.0:1.0 to 0.1:1.0,

—NCO/—OH = 0.3:1.0 to 0.02:1.0, and

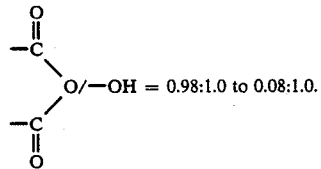
...O/—OH = 0.98:1.0 to 0.08:1.0.

8. An activation energy-curable resin composition according to claim 1 wherein the poly(meth)acrylate having an hydroxyl group per molecule is at least one compound selected from the group consisting of pentaerythritol tri(meth)acrylate, dipentaerythritol penta(meth)acrylate, trimethylol-propane di(meth)acrylate, glycerol di(meth)acrylate and tris(hydroxyethyl) isocyanurate di(meth)acrylate.

9. An activation energy-curable resin composition according to claim 1 or 8 wherein the reaction product (b) is prepared by reacting the hydroxyl group-containing poly(meth)acrylate and the diisocyanate at an equivalent ratio of the hydroxyl group of the hydroxyl group-containing poly(meth)acrylate to the isocyanate group of the diisocyanate in the range of from 1.0:2.0 to 1.3:2.0.

10. An activation energy-curable resin composition according to claim 1 wherein the resin is obtained by reacting the reaction product (a), reaction product (b) and polybasic acid or anhydride (c) at equivalent ratios of the isocyanate group (—NCO) of the reaction product (b), the group

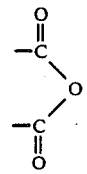

of the polycarboxylic acid or anhydride thereof (c) and the hydroxyl group (—OH) of the reaction product (a) in the following ranges

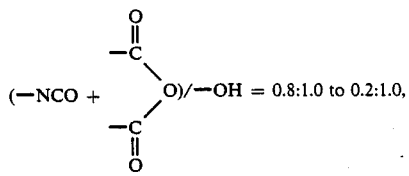
(—NCO + ...O)/—OH = 0.8:1.0 to 0.2:1.0,

—NCO/—OH = 0.2:1.0 to 0.5:1.0, and

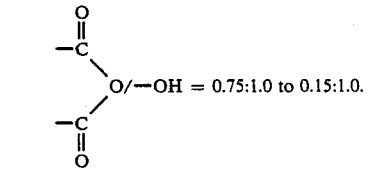
...O/—OH = 0.75:1.0 to 0.15:1.0.

* * * * *

UNITED STATES PATENT AND TRADEMARK OFFICE
CERTIFICATE OF CORRECTION

PATENT NO. : 4,918,150
DATED : April 17, 1990
INVENTOR(S) : SHIGERU SAKAKIBARA ET AL.

It is certified that error appears in the above-identified patent and that said Letters Patent is hereby corrected as shown below:

On the cover page, in the Abstract, line 5 of the Abstract, after "product", insert --containing one isocyanate group--;

line 6 of the Abstract, "moleucle" should read --molecule--.

Signed and Sealed this

Thirteenth Day of August, 1991

Attest:

HARRY F. MANBECK, JR.

Attesting Officer

Commissioner of Patents and Trademarks